United States Patent [19]

Maxfield, Sr.

[11] Patent Number: 4,918,858
[45] Date of Patent: Apr. 24, 1990

[54] MULTIPLE PURPOSE FISHING DEVICE

[76] Inventor: Marvin L. Maxfield, Sr., 609 Greenwood, #4, Wichita, Kans. 67211

[21] Appl. No.: 364,880

[22] Filed: Jun. 12, 1989

[51] Int. Cl.⁵ .............................................. A01K 97/00
[52] U.S. Cl. .................................................... 43/17.2
[58] Field of Search ............... 43/17.2, 4, 42.39, 44.81

[56] References Cited

U.S. PATENT DOCUMENTS

| | | | |
|---|---|---|---|
| 1,988,160 | 1/1935 | Butte | 43/17.2 |
| 3,160,978 | 12/1964 | Corley | 43/17.2 |
| 3,216,143 | 11/1965 | Seldon . | |
| 3,295,243 | 1/1967 | Mohar, Sr. . | |
| 3,336,067 | 8/1967 | Lloyd | 43/17.2 |
| 3,417,503 | 12/1968 | Meulnart | 43/42.39 |
| 3,680,247 | 8/1972 | McKenzie | 43/42.39 |
| 3,754,345 | 8/1973 | Whitehead . | |
| 3,769,928 | 11/1973 | Kahl . | |
| 3,805,435 | 4/1974 | Serrill . | |
| 3,866,345 | 2/1975 | Gagnon | 43/4 |
| 4,408,411 | 10/1983 | Skarnells . | |

Primary Examiner—M. Jordan
Attorney, Agent, or Firm—Kokjer, Kircher, Bradley, Wharton, Bowman & Johnson

[57] ABSTRACT

A weighted accessory for freeing snagged lures and for performing other functions requiring weighted down fishing gear. A rigid pin has loops on its opposite ends and a pair of slidable weights which are urged apart and against the loops by a compression spring. Each loop presents a gap which is normally closed by the weight but which can be opened by sliding the weight against the spring force. The gaps allow the accessory to be applied to a fishing line or net such that the line or net is threaded through one or both loops.

18 Claims, 1 Drawing Sheet

MULTIPLE PURPOSE FISHING DEVICE

BACKGROUND AND SUMMARY OF THE INVENTION

This invention relates in general to fishing gear and more specifically to a weighted fishing accessory which is capable of performing a variety of functions and which finds particular utility in freeing snagged fishing lures.

Fish hooks which become snagged on underwater obstacles can be difficult to unsnag and retrieve. As a consequence, a variety of devices have been proposed for use in freeing snagged fishing lures. By way of example, fishing lure retrievers of various types are shown in the following U.S. Pats.: No. 3,216,143 to Seldon; No. 3,295,342 to Mohar; No. 3,54,345 to Whitehead; No. 3,805,435 to Serrill; and No. 4,408,411 to Skarnells.

The devices shown in these patents are all less than satisfactory in at least some respects. Most are unduly complicated and difficult to use, and they are also lacking to some extent in effectiveness. The provision of a lure retriever that may be quickly and easily applied to a fishing line and yet retained securely thereon has proven to be a particularly troublesome problem which the present invention is aimed at solving.

The present invention is directed to a fishing accessory which is constructed to serve multiple purposes in connection with fishing activities, including the freeing of snagged lures and the weighting of fishing lines, trot lines, trawler lines and fishing nets. It is a particular feature of the invention that the device may be quickly and easily applied to a fishing line or net and removed with equal ease and dispatch. At the same time, the device is securely maintained on the line or net so that it is not subject to being inadvertently dislodged and possibly lost.

In accordance with the invention, a stiff wire is formed as a straight pin having loops on its opposite ends. Two lead weights are mounted to slide on the pin and are urged apart against the loops by a single compression spring which is coiled on the center of the pin. Each loop provides an eye having a gap which is large enough to receive a fishing line or net strand. The weights normally close off the gaps so that the device cannot inadvertently slip off of the fishing line or net. However, the weights can be purposely moved against the spring force to expose the gaps when the device is to be applied to or detached from a line or net.

DESCRIPTION OF THE DRAWINGS

In the accompanying drawings which form a part of the specification and are to be read in conjunction therewith and in which like reference numerals are used to indicate like parts in the various views.

DETAILED DESCRIPTION OF THE INVENTION

Figure 1:
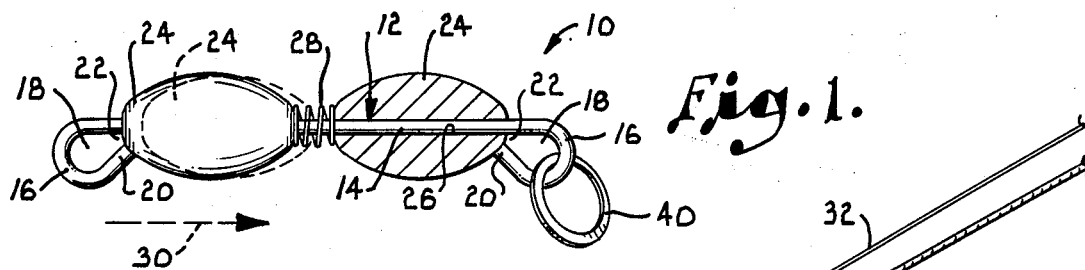
FIG. 1 is a side elevational view of a fishing accessory constructed according to a preferred embodiment of the present invention, with one of the weights shown in cross section and the broken lines illustrating the other weight moved against the spring force to open the gap in its eye.

Referring now to the drawings in more detail, numeral 10 generally designates a multiple purpose fishing accessory constructed in accordance with a preferred embodiment of the present invention. The fishing accessory 10 includes a stiff wire or pin 12 having a straight shank portion 14 provided with loops 16 on its opposite ends. The two loops 16 are bent from the opposite ends of the wire such that they curve in the same direction or to the same side of pin 12 in a loop shaped configuration. A relatively large eye 18 is formed within each loop 16. Each loop 16 terminates in a free end 20 which is spaced away from the shank 14 to present a small gap 22 which provides access to the eye 18 when the gap is open. As previously indicated, the loops 16 curve away from the shank 14 in the same direction. Therefore, the free ends 20 of loops 16 define a straight line between them which is parallel to the axis of the shank 14. In addition, both of the gaps 22 are located on the same side of the shank.

The shank 14 of pin 12 receives a pair of weights 24 which are preferably constructed of lead, although other materials may be used. Each weight 24 is a solid elliptical member which is provided with a central longitudinal passage 26 slightly larger in diameter than the shank 14. The shank 14 extends through the passage 26 of each weight 24, thus mounting the weights for axial sliding movement on shank 14 toward and away from the loops 16 which are adjacent to the respective weights.

A compression spring 28 is coiled around the center of the shank 14 and is compressed between the two weights 24. Consequently, the spring force exerted by spring 28 urges the weights 24 apart and normally maintains them in limiting positions in which the weights 24 are disposed against the respective loops 16. In the limiting position, each weight 24 is engaged against the end 20 of the corresponding loop and closes the gap 22.

Each weight 24 may be slid with the fingers away from its loop 16 and against the force exerted by spring 28. Thus, as indicated by the directional arrow 30 in FIG. 1, the left hand weight 24 may be slid to the right against the force of spring 28 from the solid line position to the broken line position. In the broken line position, the weight 24 is moved away from the corresponding loop 16 and is displaced from the gap 22 so that the gap is open or exposed. Then a fishing line or net strand may be slipped through the gap 22 into or out of the eye 18. When the weight 24 is released, spring 28 automatically returns it to its normal limiting position where it closes the gap 22. The other weight 24 may similarly be slid away from its loop 16 (to the left) to expose the gap 22.

Figure 2:
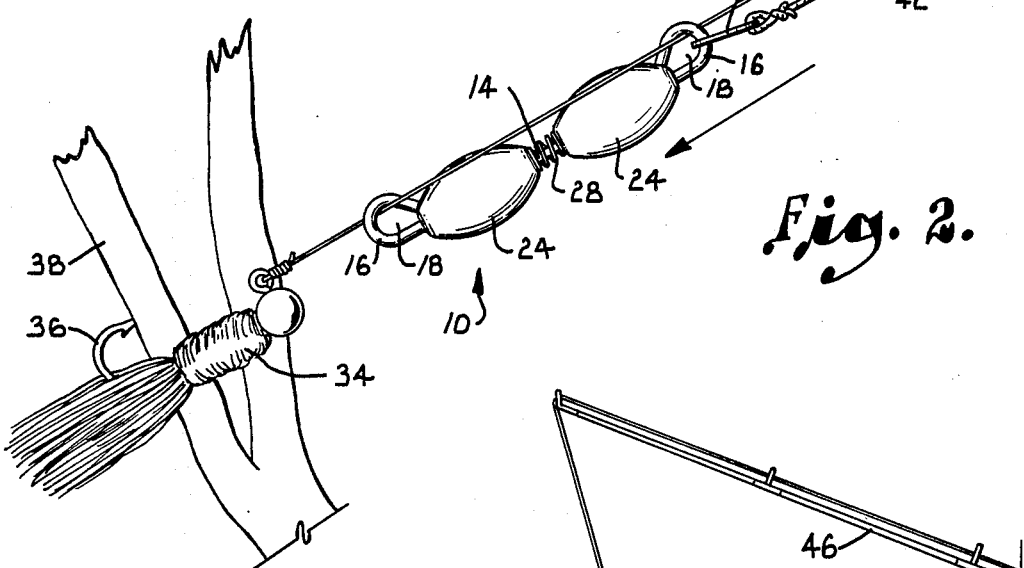
FIG. 2 is a side elevational view showing the fishing accessory applied to a fishing line in a manner to unsnag a fish hook.

In use, the fishing accessory 10 serves a variety of purposes. FIG. 2 shows the accessory 10 applied to a fishing line 32 which is equipped with a jig 34 having its hook 36 snagged on a submerged tree branch 38. A ring 40 may be interlocked with one of the loops 16 and tied to one end of a relatively heavy line 42. At the surface, the accessory 10 may be applied to the line 32 by first pushing one of the two weights 24 toward the other weight against the force of spring 28, thus opening a gap 22. Then, accessory 10 can be applied such that the open eye 18 receives the fishing line, and the gap 22 closes automatically when the displaced weight 24 is released, due to the action of the compression spring 28. The other gap 22 can then be opened by pushing the other weight 24 against the spring to install the line through the corresponding other eye. It is noted that since both of the gaps 22 are located on one side of the shank 14, it is relatively easy to manipulate the accessory, even by the use one hand, to apply each loop 16, in turn, to the fishing line 32.

After the accessory 10 has been applied to the fishing line 32 at the surface, the accessory is simply released with sufficient slack maintained in the line 42. Preferably, the fishing line 32 is maintained near a vertical orientation, although it may be inclined considerably as shown in FIG. 2. In any event, the accessory 10 slides down the line 32 and engages the snagged jig 34 with its weight acting to dislodge the fish hook 36 from the submerged obstacle 38. It is noted that the loops 16 guide the accessory along the line 32 and slide smoothly down it due to the loops on the same side of the shank. The two weights 24 are directly in line with one another as they act against the jig, thus maximizing the force that is applied to the jig upon impact. Normally, if the tip of the fishing rod is tipped or worked gently, the jig 34 will be freed easily and can be reeled in and retrieved. Line 42 is also pulled in to retrieve the accessory 10.

The accessory can be quickly and easily detached from the fishing line 32. Again, both weights 24 may be successively slid toward each other to their respective open positions, thus exposing each gap 22 in turn so that the line can pass through the gaps and out of the eyes 18.

Figure 3:
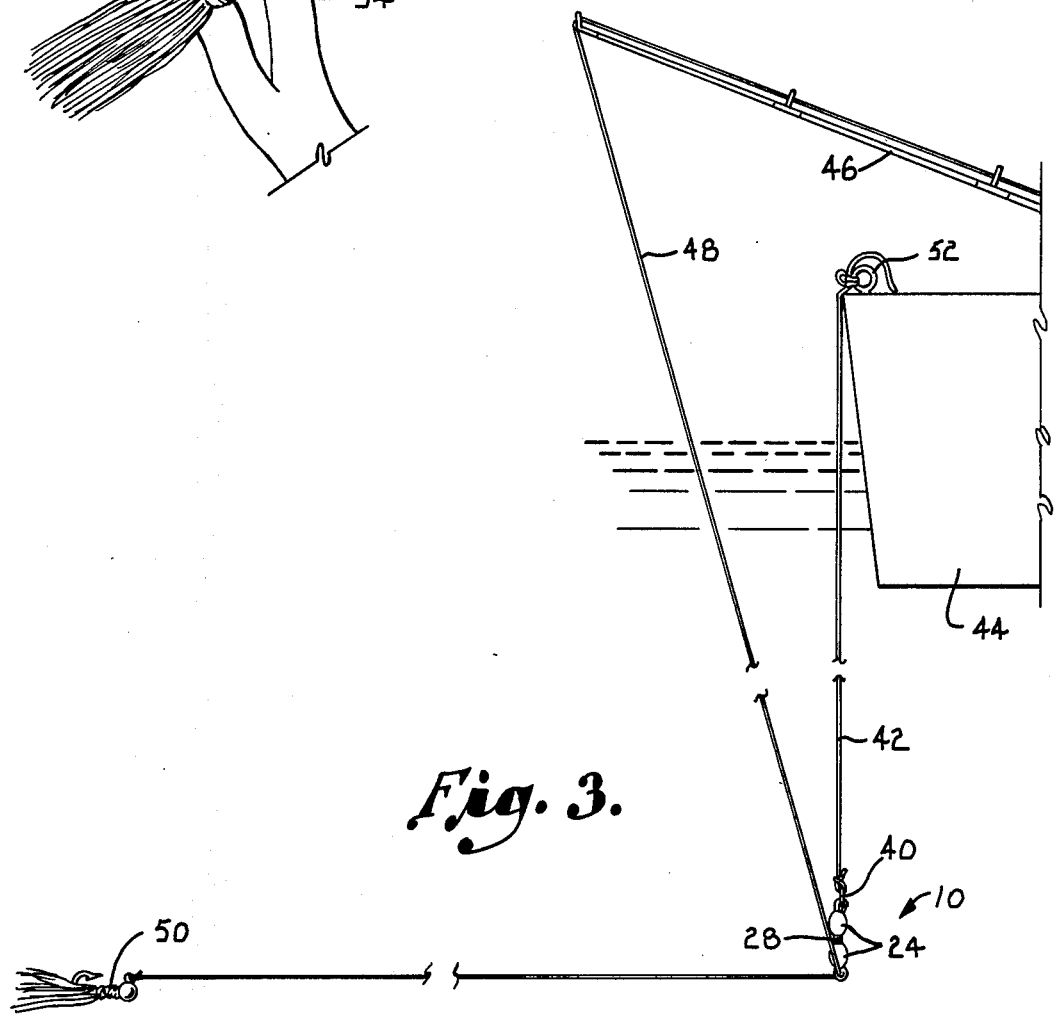
FIG. 3 is a side elevational view showing the fishing accessory used to hold down a fishing line in a deep water trolling application, with the break lines indicating continuous length.

FIG. 3 shows an application in which the fishing accessory 10 is used in deep water trolling conducted from a boat 44. A fishing rod 46 in the boat receives a fishing line 48 having a lure on its end such as the jig 50. In this application, only one of the loops 16 of the accessory 10 is applied to the fishing line 48. The other loop 16 remains free of the fishing line, and the line 42 on which the accessory is tied is secured to a ring 52 or other tie device mounted on the boat 44. When the proper length of the fishing line 48 has been payed out, the accessory 10 is applied to the fishing line by opening one of its loops and applying the loop to the line 48. The accessory can then be dropped into the water, and its line 42 will hang vertically as shown in FIG. 3. Since the line 48 is threaded through one of the loops 16, the end portion of the fishing line 48 which carries the lure 50 extends generally horizontally from the accessory 10 as deep water trolling occurs. It is noted that the depth at which the lure 50 is maintained can be adjusted by adjusting the length of the line 42 which is tied to the fishing accessory 10.

The accessory 10 can also be used to weight down a fishing net, a trot line or a trawler line. In all of these applications, it can be quickly and easily applied to and detached from the line or net. In the case of a fishing net, both loops 16 are preferably applied to the net by passing the selected net strand through the gaps 22 while they are held open.

The fishing accessory 10 is devoid of sharp edges or corners that are exposed and could possibly become snagged on obstructions. In normal use, only the curved surfaces of the weights 24 and the curved loop 16 come in contact with under water debris or other obstacles, and the accessory is thus not prone to becoming snagged on submerged obstacles.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. A fishing accessory comprising:
    a substantially straight pin element having opposite ends;
    a loop on one end of said pin element, said loop being arranged to present an eye and a gap in the eye providing access thereto;
    a weight received on said pin element for axial sliding movement thereon toward and away from said loop;
    a second weight on said pin element at a location spaced away from the first mentioned weight; and
    retaining means comprising a compression spring compressed between said first and second weights and acting to urge the first weight toward said loop, said spring being yieldable to permit movement of the first weight away from the loop to open said gap.

2. The fishing accessory of claim 1, wherein said loop terminates in a free end spaced away from said pin element to present said gap between said free end and said pin element.

3. The fishing accessory of claim 1, including:
    a second loop on said pin element on the end thereof opposite said one end, said second loop being arranged to present an eye and a gap in the eye providing access thereto;
    said second weight on said pin element being located between the first mentioned weight and said second loop, said second weight having a limiting position in which the second weight is disposed against the second loop and acts to close the gap thereof; and
    said compression spring compressed between said first and second weights urging said weights apart toward the limiting position of each weight.

4. The fishing accessory of claim 3, wherein each of said loops terminates in a free end spaced away from the pin element to present said gaps between the respective free ends and pin element, said free ends being located on a line oriented substantially parallel to the axis of said pin element.

5. The fishing accessory of claim 3, wherein said gaps in the first and second loops are both located on one side of the pin element.

6. A weighted fishing accessory comprising:
    a pin element having a substantially straight shank presenting opposition ends;
    a loop on one end of said shank presenting an eye and a gap which provides a passage into and out of the eye when the gap is open;
    a weight received on said shank for axial sliding movement thereon toward and away from said loop, said weight acting to close said gap when disposed against said loop; and spring means for urging said weight toward the loop, said spring means being yieldable to permit movement of the weight away from the loop to open the gap.

7. The fishing accessory of claim 6, including a second weight on said pin element at a location spaced away from the first mentioned weight.

8. The fishing accessory of claim 7, wherein said spring means comprises a compression spring compressed between said first and second weights.

9. The fishing accessory of claim 6, wherein said loop terminates in a free end spaced away from said shank to present said gap between said free end and shank.

10. The fishing accessory of claim 8, including:
a second loop on said shank on the end thereof opposite said one end, said second loop presenting an eye and a gap which provides a passage into and out of the second loop eye when open;
a second weight received on said shank for axial sliding movement thereon, said second weight being located between said second loop and the first mentioned weight and acting to close the second loop gap when disposed against the second loop; and
said spring means acting to urge said second weight toward the second loop and being yieldable to permit movement of the second weight away from the second loop to open the gap therein.

11. The fishing accessory of claim 10, wherein said spring means comprises a compression spring on said shank compressed between the first and second weights.

12. The fishing accessory of claim 11, wherein each of said loops terminates in a free end spaced away from said shank to present said gaps between the respective free ends and shank, said free ends being located on a line oriented substantially parallel to the axis of said shank.

13. The fishing accessory of claim 10, wherein each of said loops terminates in a free end spaced away from said shank to present said gap between said free end and shank.

14. The fishing accessory of claim 10, wherein said gaps in the first and second loops are both located on one side of said shank.

15. A fishing accessory comprising:
a substantially straight pin element having opposite first and second ends;
first and second loops on the respective first and second ends of the pin element, each loop being arranged to present an eye and a gap in the eye through which a fishing line can pass into and out of the eye when the gap is open;
first and second weights received on said pin element for axial sliding movement adjacent the respective first and second loops, said first and second weights having limiting positions engaging the respective first and second loops and closing the gaps therein; and
spring means for urging said first and second weights toward the limiting positions thereof, said spring means being yieldable to permit each weight to move away from the limiting position thereof to open the gap in the corresponding loop.

16. The fishing accessory of claim 15, wherein said spring means comprises a compression spring on said pin element compressed between said first and second weights to urge them apart toward the limiting positions.

17. The fishing accessory of claim 15, wherein each of said loops terminates in a free end spaced away from the pin element to present said gaps between the respective free ends and pin element, said free ends being located on a line oriented substantially parallel to the axis of said pin element.

18. The fishing accessory of claim 15, wherein said gaps in the first and second loops are both located on one side of the pin element.

* * * * *